United States Patent [19]

Woermann et al.

[11] 4,254,091

[45] Mar. 3, 1981

[54] DIAMOND SYNTHESIS

[76] Inventors: Eduard Woermann, Joseph Ponten Str. 57, Aachen; Barbara Knecht, Beutinger Str. 16, Heilbronn; Matthias Roshenhauer, Alfred Messel Weg 14 A., Darmstadt, all of Fed. Rep. of Germany

[21] Appl. No.: 67,172

[22] Filed: Aug. 16, 1979

Related U.S. Application Data

[63] Continuation of Ser. No. 904,437, May 9, 1978, abandoned.

[30] Foreign Application Priority Data

May 13, 1977 [DE] Fed. Rep. of Germany ....... 2721644

[51] Int. Cl.³ .............................................. C01B 31/06
[52] U.S. Cl. .................................................... 423/446
[58] Field of Search ........................................ 423/446

[56] References Cited

U.S. PATENT DOCUMENTS

| | | | |
|---|---|---|---|
| 2,947,610 | 8/1960 | Hall et al. | 423/446 |
| 3,906,082 | 9/1975 | Shulzhenko et al. | 423/446 |

FOREIGN PATENT DOCUMENTS

| | | | |
|---|---|---|---|
| 1353164 | 5/1974 | United Kingdom | 423/446 |
| 1400534 | 7/1975 | United Kingdom | 423/446 |

OTHER PUBLICATIONS

Bovenkerk et al, "Nature" Oct. 10, 1959, vol. 184, pp. 1094–1098.
Wentorf "The Journal of Physical Chemistry" vol. 69, No. 9, 1965, pp. 3063–3069.

*Primary Examiner*—Edward J. Meros
*Attorney, Agent, or Firm*—John C. Purdue

[57] ABSTRACT

The synthesis of diamonds from salts of iron, manganese, calcium and magnesium is disclosed. Specifically, such synthesis, in a closed system, has involved carbonate and oxylate salts of the indicated metals. The reaction occurs at temperatures between 550° and 1600° C., higher temperatures requiring higher reaction pressures; specifically, the production of synthetic diamonds from ferrous carbonate is disclosed. The ferrous carbonate was packed into a platinum capsule which was sealed gas-tight, packed in unfired pyrophyllite, and heated for two hours at 900° C. while in a solid media press which applied a pressure of 40 kb (subsequently defined).

7 Claims, No Drawings

DIAMOND SYNTHESIS

This is a continuation of application Ser. No. 904,437, filed May 9, 1978, now abandoned.

DEFINITIONS

The term "kb", as used herein, means thousands of bars, one bar constituting $10^6$ dynes per square centimeter, or substantially 0.98623 standard atmosphere.

The term "T" as used herein, means temperature, in degrees Kelvin.

The term "p" as used herein, means pressure in atmosphere.

BACKGROUND OF THE INVENTION

Diamond is a polymorphic modification of carbon. Further known modifications are graphite and metallic carbon.

In the earth's crust, graphite is the thermodynamically stable form of carbon. Diamond is stable only at high pressures as found in the zone of the earth's mantle. As a natural mineral, diamond is found in kimberlite which is a basic rock produced by volcanic activity from great depth within the earth respectively from kimberlite originating secondary sources.

The equilibrium conditions between graphite and diamond are given by the equation of R. Berman and F. Simon (Zeitschrift für Electrochemie 59 (1955) 333) and by the work of Berman (1st International Congress on diamonds in industry, 1962):

$$P = 7000 + 27T \quad (T > 1200)$$

This Simon-Berman curve has been proven in all following investigations and thus seems to be reliable.

In previous decades many experiments have been made with regard to synthesizing artificial diamonds. Thereby, research was concentrated entirely on the polymorphic change of graphite into diamond under high pressures. All these experiments were in general unsuccessful. Graphite remained as a metastable phase even in the stability field of diamond. The nucleation and transformation rates are too low as long as the stability boundary (of diamond) was not greatly exceeded.

F. P. Bundy, H. T. Hall, H. M. Strong and R. H. Wentorf first succeeded in synthesizing diamonds in 1955 ("Man-made diamonds", Nature 176, No. 4471, 51-55). A corresponding patent on "The Method of Synthesis of Diamonds" was awarded to G. E. Company, U.S.A. H. P. Bovenkerk is named as the inventor. In the Federal Republic the patent was filed on Dec. 14, 1959 as application No. 1,142,346.

The basic content of the above-mentioned patent relates to the observation that graphite changes into diamond in the stability field of diamond by the catalytic influence of such metals as Fe, Co, Ni, Cr, Mn and others. The presumption is that the metal is provided in the molten state. To fulfill this demand, high temperatures are required. Because of the positive P/T-relationship of the Simon-Berman equation, corresponding high pressures are at the same time required. With a similar patent and method in principal, the ASEA operates in Sweden.

Since then further experiments to synthesize diamonds have been tried. Especially to be mentioned are the following methods:

(1) At low pressures and temperature around 1000° C., methane is passed over diamond nuclei. In the beginning diamond grows metastably, but ultimately the anticipated stable graphite nucleates in the methods of Eversole, 1962, Takasu, 1965, Angus et al, 1968, and Derjuguin et al, 1975, (also see U.S. Pat. No. 3,030,188 of Union Carbide Corp.). A further procedure for the synthesis of diamonds under mild synthesis conditions depends on the invention of Federal Republic disclosure No. 1,667,532 of H. Grenner, Munich (1967), that carbon from the electrolysis of alkali-cynanide—that is to say carbide-melts under the influence of catalysts—can occur as diamond. These named, partially patented methods of synthesis do not explain the genesis of natural diamonds.

THE INSTANT INVENTION

The present invention is based on the observation that crystalline carbon is freed through the high pressure reduction of a carbon- and oxygen-containing compound such as carbon dioxide, carbon monoxide, carbonates, or the like. The aforementioned reduction freed crystalline carbon when formed in the P/T zone above the Simon-Berman curve, $P = 7000 + 27T$, occurs as the diamond, but when formed below this curve, occurs as graphite. Subsequent experiments have shown that the Simon-Berman curve can be used for values of T from 823 to 1873. Such a method of diamond synthesis leans toward a natural diamond genesis, in which crystalline carbon in the earth's interior can only be or have been formed when appropriate environmental conditions exist.

Because the aforementioned reduction appears to proceed without the formation of any graphite nuclei, a reduction of carbon dioxide, carbonates, or other carbon- and oxygen-containing compounds, according to the present invention in the stability field of the diamond avoids the extremely sluggish polymorphic change of graphite into diamond. As a consequence, the high temperatures which are required for the melting of the metal alloys in the aforementioned patent of the General Electric Company are not necessarily required in practicing the present invention.

The following reduction reactions have been investigated, and found to be operable for the synthesis of diamonds according to the present invention:

$$6\,FeCO_3 = 2Fe_3O_4 + 5CO_2 + C_{dia}$$

$$FeCO_3 + 5FeO = 2Fe_3O_4 + C_{dia}$$

$$MnCO_3 + 5MnO = 2Mn_3O_4 + C_{dia}$$

$$MgCO_3 + 5MnO = 2(Mg,Mn)Mn_2O_4 + C_{dia}$$

$$CaCO_3 + 5MnO = 2(Ca,Mn)Mn_2O_4 + C_{dia}$$

$$3Fe(COO)_2 \cdot 2H_2O = Fe_3O_4 + 4CO_2 + 2C_{dia} + 2H_2O$$

$$2CaCO_3 + 3Fe = Ca_2Fe_2O_5 + FeO + 2C_{dia}$$

$$2CaCO_3 + 3Cr = (Ca,Cr)Cr_2O_4 + 2C_{dia}$$

The foregoing reactions were found to occur at temperatures between 550° and 1600° C. with the optimal result in the range of 900° C. and 40kb: reaction time of two hours. Because of the positive P/T relation of the graphite-diamond equilibrium higher temperatures also require higher pressures, so that an advantage is given by reactions at lower temperatures. Nucleation and crystal growth can be controlled through further influences; for examples, there appear to be optimum heating rates, and changes in pressure and temperature ranges as reaction proceeds, as well as choice of reagent(s) can be controlled for optimum results.

Any conventional apparatus capable of providing pressures and temperatures in excess of the Simon-Berman curve up to 1600° C. can be used in producing diamonds according to the invention. For example, for syntheses at 1100° C., pressure of 45kb are sufficient.

The invention relates to a method of production of artificial diamonds through purposeful reduction of fluid or solid carbon-rich oxide compounds-carbon dioxide, carbon monoxide, carbonates, acetates, oxalates, carbonyls and so forth in the stability field of diamond.

DESCRIPTION OF PREFERRED EMBODIMENTS

Platinum capsules having a 2 mm. inner diameter and 5 mm. in length were charged to capacity with ferrous carbonate, and sealed gas-tight in an electric arc. The capsules were then built into a solid media pressure assemblage consisting of unfired pyrophyllite, and having, as a heating element, a molybdenum cylindrical furnace. The diameter of the cylindrical furnace was 4 mm., and the height was 21 mm. The pressure assemblage was then placed in a solid media press of the "Belt" type, and subjected to a pressure of 40 kb. Electrical resistance heating was then used to heat the capsules to a temperature of 900° C., as indicated by a platinum-platinum rhodium thermocouple having its junction in contact with the platinum capsule. The pressure and temperature were held constant, as indicated by electronic controllers for a period of two hours. The pressure assemblage was then allowed to cool, and the pressure was released. The reaction product was removed from the platinum capsule and dissolved in hydrochloric acid. Diamond particles ranging from 2 to 10 microns in size remained as a residue in the solution. The identity of the diamond was determined microscopically by measuring the index of refraction (4.5), by X-ray examination (which indicated a cubic structure), and by both transmission electronmicroscopy and scanning electronmicroscopy.

The specific ferrous carbonate used as described in the foregoing Example was produced synthetically from ferrous oxalate: $Fe(COO)_2.2H_2O$. The oxalate was packed into the central opening of platinum capsules as described above, and the capsules were sealed gas-tight in an electric arc. The capsules were then subjected to a pressure of 2 kb and a temperature ranging from 350°–380° C. for two days. The reaction products were determined by miscroscopic and X-ray examination to constitute ferrous carbonate.

It has been demonstrated that diamonds can also be produced directly from ferrous oxalate, without an intermediate recovery of ferrous carbonate, and that diamonds can be produced in accordance with the equations previously set forth. It will be appreciated that naturally occurring carbonates, e.g. magnesite and dolomite, because of their availability and comparatively low cost constitute a preferred family of starting materials. However, others can also be used, and should be, in general, carbon dioxide, carbon monoxide or a metal salt of an oxygen-containing organic acid, usually of an organic acid having at least one carboxyl group.

It will be appreciated that, in its essential details, the instant method provides a method for producing a synthetic diamond, and that the method comprises heating a reactant in a closed system to a reaction temperature from 550 to 1600° C. The reactant is a metal salt of an oxygen-containing organic acid, carbon dioxide or carbon monoxide. Preferably, the metal of the salt is nickel, chromium, iron, manganese, magnesium or calcium and, most desirably, the anion portion of the salt is carbonate. During heating, the reactant and reaction products are maintained under a pressure greater than 7000+27 times the reaction temperature in degrees Kelvin. The reaction time can vary substantially, two hours being substantially optimum when the reaction temperature is in the vicinity of 1000° C. However, at a reaction temperature in the vicinity of 1600° C., diamond formation may be observed after as few as five minutes at temperature, having been observed after such time at 1100° C. and 57 kb.

It will be apparent that various changes and modifications can be made from the invention as specifically described herein without departing from the spirit and scope of the appended claims.

We claim:

1. A method for the synthesis of diamonds, which method includes the steps of heating at least one carbon-containing compound selected from the group consisting of $FeCO_3$, $MnCO_3$, $MgCO_3$, $CaCO_3$ and $Fe(COO)_2$ to a temperature in the range of 550° to 1600° C. in the presence of a reducing agent for the carbon-containing compound selected from the group consisting of $FeCO_3$, FeO, MnO, Fe and Cr, while maintaining a pressure in the range of 29 to 45 Kilobars, and controlling temperature and pressure so that the pressure in atmospheres is greater than 7000+27 T, where T is the temperature in degrees Kelvin, whereby elementary carbon is freed from the carbon-containing compound in the diamond form.

2. A method as claimed in claim 1 wherein the reducing agent is $FeCO_3$.

3. A method as claimed in claim 2 wherein iron carbonate is reduced at a pressure of 40 Kilobars and a temperature of 900° C. for two hours to produce $Fe_3O_4$, $CO_2$ and C in the diamond phase.

4. A method as claimed in claim 1 wherein FeO is used as a reducing agent.

5. A method as claimed in claim 1 wherein MnO is used as a reducing agent.

6. A method as claimed in claim 1 wherein iron is used as a reducing agent.

7. A method as claimed in claim 1 wherein chromium is used as a reducing agent.

* * * * *

UNITED STATES PATENT AND TRADEMARK OFFICE
CERTIFICATE OF CORRECTION

PATENT NO. : 4,254,091
DATED : March 3, 1981
INVENTOR(S) : Eduard Woermann, Barbara Knecht & Matthias Rosenhauer It is certified that error appears in the above-identified patent and that said Letters Patent are hereby corrected as shown below:

Please correct the patent to indicate that the third-named inventor's correct last name is Rosenhauer.

Signed and Sealed this

Second Day of June 1981

[SEAL]

Attest:

*Attesting Officer*

RENE D. TEGTMEYER

*Acting Commissioner of Patents and Trademarks*